United States Patent
Krishnan (10) Patent No.: US 10,952,129 B2
(45) Date of Patent: Mar. 16, 2021

(54) NETWORK ACCESS TECHNOLOGY INDICATION

(71) Applicant: TELEFONAKTIEBOLAGET LM ERICSSON (PUBL), Stockholm (SE)

(72) Inventor: Suresh Krishnan, Suwanee, GA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/742,141

(22) PCT Filed: Feb. 12, 2016

(86) PCT No.: PCT/IB2016/050773
§ 371 (c)(1),
(2) Date: Jan. 5, 2018

(87) PCT Pub. No.: WO2017/006188
PCT Pub. Date: Jan. 12, 2017

(65) Prior Publication Data
US 2018/0199274 A1 Jul. 12, 2018

Related U.S. Application Data

(60) Provisional application No. 62/189,024, filed on Jul. 6, 2015.

(51) Int. Cl.
*H04W 48/16* (2009.01)
*H04W 88/10* (2009.01)
(Continued)

(52) U.S. Cl.
CPC .......... *H04W 48/16* (2013.01); *H04W 8/245* (2013.01); *H04W 48/12* (2013.01);
(Continued)

(58) Field of Classification Search
CPC . H04W 48/16; H04W 72/1215; H04W 8/245; H04W 76/15; H04W 48/12; H04W 88/10; H04W 88/06; H04W 88/04
See application file for complete search history.

(56) References Cited

U.S. PATENT DOCUMENTS 7,003,331 B2  2/2006 Cromer et al.
8,971,849 B2  3/2015 Bhatia et al.
(Continued)

FOREIGN PATENT DOCUMENTS

CN  103491262 A  1/2014
CN  104202478 A  12/2014
(Continued)

OTHER PUBLICATIONS

S. Bradner, Key words for use in RFCs to Indicate Requirement Levels, Network Working Group, RFC 2119, Mar. 1997, 3 pages.
(Continued)

*Primary Examiner* — Thai Nguyen (57) ABSTRACT

Systems and methods are provided for exchanging network connection access technology information amongst nodes in a communication network. An access point such as a router can include an indication of the access technology used for its network connection in a message for the end-user network device (e.g LTE). The network device can connect to the router using a different access technology (e.g. WLAN) for its local connection, nut exploits the router's network access technology information received to determine the own behaviour (e.g. stop applications or software updates).

20 Claims, 8 Drawing Sheets

(51) Int. Cl.
*H04W 48/12* (2009.01)
*H04W 76/15* (2018.01)
*H04W 8/24* (2009.01)
*H04W 72/12* (2009.01)
*H04W 88/04* (2009.01)
*H04W 88/06* (2009.01)

(52) U.S. Cl.
CPC ....... *H04W 72/1215* (2013.01); *H04W 76/15* (2018.02); *H04W 88/10* (2013.01); *H04W 88/04* (2013.01); *H04W 88/06* (2013.01)

(56) References Cited

U.S. PATENT DOCUMENTS

| | | |
|---|---|---|
| 2004/0002366 A1 | 1/2004 | Cromer et al. |
| 2005/0237963 A1 | 10/2005 | Storm |
| 2006/0121935 A1 | 6/2006 | Dalsgaard et al. |
| 2007/0076675 A1 | 4/2007 | Chen |
| 2007/0133447 A1 | 6/2007 | Wentink |
| 2010/0226310 A1 | 9/2010 | Kuparinen et al. |
| 2010/0284386 A1 | 11/2010 | Ulupinar et al. |
| 2011/0319072 A1 | 12/2011 | Ekici et al. |
| 2011/0319073 A1 | 12/2011 | Ekici et al. |
| 2013/0010753 A1 | 1/2013 | Chen et al. |
| 2013/0067061 A1* | 3/2013 | Khalid ............... H04L 43/16 709/224 |
| 2013/0137423 A1 | 5/2013 | Das et al. |
| 2014/0023058 A1 | 1/2014 | Sun et al. |
| 2015/0063230 A1 | 3/2015 | Feng |
| 2015/0089587 A1 | 3/2015 | Hurtta |
| 2015/0163840 A1* | 6/2015 | Ji ........................... H04W 8/005 455/552.1 |
| 2017/0006614 A1* | 1/2017 | Reddy ................. H04W 72/046 |

FOREIGN PATENT DOCUMENTS

| | | |
|---|---|---|
| CN | 104349401 A | 2/2015 |
| CN | 104363588 A | 2/2015 |
| JP | 2004-153802 A | 5/2004 |
| JP | 2006-508621 A | 3/2006 |
| JP | 2010-521847 A | 6/2010 |
| JP | 2014-183481 A | 9/2014 |
| RU | 2507716 C2 | 7/2013 |
| WO | 2004/062114 A2 | 7/2004 |
| WO | 2005/109912 A1 | 11/2005 |
| WO | 2008/113406 A1 | 9/2008 |
| WO | 2015/087112 A1 | 6/2015 |

OTHER PUBLICATIONS

J. Arkko et al., SEcure Neighbor Discovery (SEND), Network Working Group, RFC 3971, Mar. 2005, 56 pages.
Patent Abstracts of Japan for JP 2014-183481.
Patent Abstracts of Japan for JP 2004-153802.
ISR and Written Opinion from related application PCT/IB16/54053.
T. Narten et al., Neighbor Discovery for IP version 6 (IPv6), Network Working Group, RFC 4861, Sep. 2007, pp. 1-97.
Soonghwan Ro, Fast Return Routability Test for Mobile Management, James J. (Jong Hyuk) Park et al. (eds.), Future Information Technology, Application, and Service, Springer Science + Business Media Dordrecht, 2012, pp. 309-312.
Dan Hulme, How to block apps on tablet from accessing the Internet while on tethering, Mar. 19, 2014, Retrieved from the Internet: https://android.stackexchange.com/questions/63987/how-to-block-apps-on-tablet-from-accessing-the-internet-while-on-tethering, 8 pages.
International Search Report from corresponding application PCT/IB2016/050773.
IPRP from corresponding application PCT/IB2016/050773.
Patentscope—Abstract in English of CN 104363588.
Patentscope—Abstract in English of CN 104202478.
Patentscope—Abstract in English of CN 103491262.

\* cited by examiner

Figure 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |     Uplink Access Technology  |
+-+-+-+-+-+-+-+-+-+-+-+-+-+-+-+-+-+-+-+-+-+-+-+-+-+-+-+-+-+-+-+-+
|                         reserved (set to 0)                   |
+-+-+-+-+-+-+-+-+-+-+-+-+-+-+-+-+-+-+-+-+-+-+-+-+-+-+-+-+-+-+-+-+
```

| UAT | Access Technology Type |
|---|---|
| 0x01 | 3GPP |
| 0x02 | DSL |
| 0x03 | Cable |
| 0x04 | Ethernet |

NETWORK ACCESS TECHNOLOGY INDICATION

CROSS REFERENCE TO RELATED APPLICATIONS

This application is a 35 U.S.C. § 371 national phase filing of International Application No. PCT/IB2016/050773, filed Feb. 12, 2016, which claims the benefit of U.S. Provisional Application No. 62/189,024, filed Jul. 6, 2015, the contents of which are incorporated herein by reference in their entireties.

TECHNICAL FIELD

This disclosure relates generally to systems and methods for communicating information related to a network access technology being used between devices.

BACKGROUND

Many of today's network devices are capable of accessing communication networks using multiple technologies. For instance, a mobile device can be capable of establishing both a cellular connection such as Long Term Evolution (LTE) and/or a local area network (LAN) connection via WiFi or other means.

Some devices are further capable of sharing their network connection with other devices, thus acting as a router or access point for the other devices. This feature allows for sharing a single Internet connection on one device between other devices on the same LAN. In some situations, the device acting as an access point will use one type of access technology for its northbound connection to the network and another type of access technology for sharing its southbound connection with the other devices.

A device may be configured to have different modes of operation, behaviors or actions which can depend on the specific access technology used. As such, the capabilities of the device can be dynamic and depend on its type of network connection. Some issues can arise when a device is capable of connecting with multiple access technologies.

Therefore, it would be desirable to provide a system and method that obviate or mitigate the above described problems.

SUMMARY

It is an object of the present invention to obviate or mitigate at least one disadvantage of the prior art.

In a first aspect of the present invention, there is provided a method for indicating a network access technology used by an access point. The method includes establishing, by the access point, a network connection with an access network using a first access technology. A local network advertisement is transmitted. An indication of the first access technology used by the access point for the network connection is transmitted.

In another aspect of the present invention, there is provided an access point device comprising circuitry including a processor and a memory. The memory contains instructions executable by the processor whereby the access point device is operative to establish a network connection with an access network using a first access technology. The access point device is operative to transmit a local network advertisement, and to transmit an indication of the first access technology used by the access point for the network connection.

In another aspect of the present invention, there is provided an access point device comprising a northbound connection module for establishing a network connection with an access network using a first access technology; and a southbound connection module for transmitting a local network advertisement, and for transmitting an indication of the first access technology used by the access point for the network connection.

In some embodiments, the local network advertisement can be transmitted using a second access technology. The first access technology and the second access technology can be different types of access technologies. The indication of the first access technology can be transmitted responsive to determining that the first access technology and the second access technology are different types of access technologies. In some embodiments, the indication of the first access technology used for the network connection can be transmitted by the access point over the local network.

In some embodiments, a local connection request can be received from a device over the local network. The indication of the first access technology used for the network connection can be transmitted by the access point to the device over the local network.

In some embodiments, transmitting the local network advertisement can include sending a router advertisement message. The indication of the first access technology used for the network connection can be included in the local network advertisement or in a subsequent message.

In some embodiments, transmitting the local network advertisement can include sending a network information control message associated with the local network. The indication of the first access technology used for the network connection can be included in the network information control message or in a subsequent message.

In some embodiments, the access point device can be a user equipment capable of sharing its network connection with one or more other devices In another aspect of the present invention, there is provided a method for receiving network access technology information. The method comprises receiving, by a network device, a local network advertisement from an access point; and receiving, by the network device, an indication of a first access technology used by the access point to connect to an access network.

In another aspect of the present invention, there is provided a network device comprising circuitry including a processor and a memory. The memory contains instructions executable by the processor whereby the network device is operative to receive a local network advertisement from an access point; and to receive an indication of a first access technology used by the access point to connect to an access network.

In another aspect of the present invention, there is provided a network device comprising a network connection module and an operating module. The network connection module is configured for receiving a local network advertisement from an access point, and for receiving an indication of a first access technology used by the access point to connect to an access network. The operating mode module is configured for selecting a mode of operation of the network device in accordance with the first access technology used by the access point.

In some embodiments, the indication of the first access technology used by the access point can be included in the received local network advertisement. The local network advertisement can be a network information control message transmitted by the access point. Alternatively, the local network advertisement can be a router advertisement message transmitted by the access point. The indication of a first access technology used by the access point can be included in an option field in a router advertisement message.

In some embodiments, the local network advertisement can be received via a second access technology. The network device can optionally determine that the first access technology and the second access technology are different types of access technologies.

In some embodiments, the network device can select a mode of operation of the network device in accordance with the first access technology used by the access point. Selecting a mode of operation of the network device can be further based at least in part on a second network access technology associated with the local network advertisement. Selecting a mode of operation can include restricting data communication activity of the network device.

The various aspects and embodiments described herein can be combined alternatively, optionally and/or in addition to one another.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

Embodiments of the present disclosure are directed to mechanisms for sharing access technology information between network access points and their connected devices. A connected device can operate in accordance with the type of access technology that is used by its access point for its network connection.

In an exemplary Internet Protocol version 6 (IPv6) network, Router Advertisements can be used for providing common configuration information to nodes that are attached. It may be advantageous for a router to be capable of providing its uplink network access technology information and/or for an attached node to be capable of obtaining knowledge of the access technology used by the router. Embodiments of the present disclosure provide a neighbor discovery option that will allow routers to share this information.

In IPv6 and other networks, the access technology used by routers on their uplinks (e.g. the connection to an access network such as the Internet) can be different from the access technologies used on their downlinks (e.g. the local network provided by the router). There are some scenarios where it may be advantageous for a router to provide its uplink access technology information to the host(s) attached on the downlink(s). One such example is a "tethering" scenario where a mobile phone that uses a cellular network connection, such as LTE, shares its internet connection with other devices that connect over a local connection, such as a wired connection or a WiFi network link. In this case it may be beneficial for the device(s) to know that the actual network connection of the mobile phone acting as the access point is a cellular link, even though the device is connected via WiFi. The host devices can potentially modify their behavior based on this knowledge. For example, application and software updates (and similar bulk transfers) that are dependent on a network connection could be rescheduled based on administrative configuration.

It will be appreciated by those skilled in the art that the terminology of "uplink" and "downlink" is used herein to differentiate between the two distinct connections associated with a router/access point. The first connection is the router's "uplink" network connection to an access network, which is commonly referred to as its northbound connection. The second connection is the "downlink" local network connection that is provided by the router, which is commonly referred to as its southbound connection. Any reference to uplink/downlink is relative to the router's connection "up" to the access network and "down" to any connected devices, and is not intended specify the flow of data. It will be appreciated that, in this context, both the uplink and downlink connections of a router can carry bi-directional traffic.

Those skilled in the art will appreciate that, in this context, a northbound interface refers to an interface that allows an access point to communicate with an access network. Conversely, a southbound interface allows the access point to communicate with an attached device.

Figure 1:
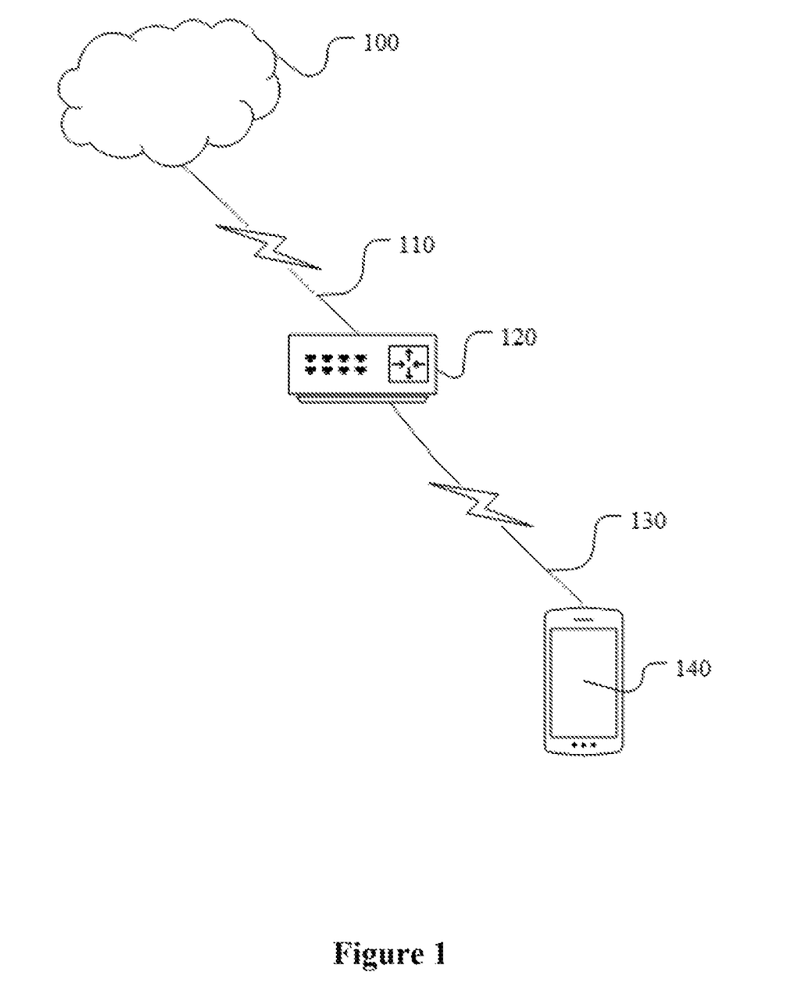
FIG. 1 illustrates an example communication network.

FIG. 1 illustrates an example communication network architecture. An example network 100 can be a private network such as a telecommunication operator network, or a public network such as the Internet. A router or access point 120 connects to the network 100 via a northbound network connection 110. Depending on the router device 120 and/or the network 100 and/or other factors, multiple types of access technologies can be used to establish the network connection 110. In one example embodiment, router 120 can be a first user equipment (UE) that establishes an LTE cellular connection 110 with the network 100 (e.g. via a base station such as an eNodeB).

The first UE 120 can be capable of tethering, or sharing its network connection with other devices (such as other laptops, mobile phones, tablets, etc.). The southbound local connection of the first UE 120 to the other devices can be established over wireless LAN (e.g. WiFi), over Bluetooth, by physical connection using a cable (e.g. through Universal Serial Bus (USB)), or by any other means. If tethering is done over WiFi, the feature is commonly referred to as a "mobile hotspot". Therefore the network-connected first UE 120 acts as a portable access point and router for the devices connected to it.

In FIG. 1, a second UE 140 is shown as connected to the router device 120 via the router's southbound local connection 130. As discussed above, the local network connection 130 can be a WiFi connection. In this example embodiment, the northbound (network) 110 and the southbound (local) 130 connections of the router 120 use different access technology types. From the perspective of the second UE 140, it is network-connected using WiFi. Conventionally, the second UE 140 has no knowledge that it is ultimately connected to the access network 100 via the LTE connection 110 of its access point 120. Embodiments of the present disclosure provide mechanisms for an access point 120 to communicate the network access technology (e.g. LTE) is it using to any connected devices, such as the second UE 140.

The second UE 140 may be configured to operate in different modes depending on its connection type. For example, the UE 140 can be configured to operate in a first mode when its connection type is WiFi. In this first mode of operation, the UE 140 may automatically perform some functions related to downloading and/or uploading information. For example, the UE 140 can be configured to automatically download updates to software or applications whenever it is connected via WiFi. The UE 140 can be configured to automatically upload photos and/or videos to network storage when connected via WiFi.

The UE 140 can further be configured to operate in a second mode when its connection type is cellular (e.g. LTE, 4G, 3G, CDMA, etc.). In this second mode of operation, the UE 140 may be configured to suspend downloading or uploading functions while connected via cellular. Alternatively, UE 140 can be configured to prompt the user for confirmation of a performing a downloading or uploading task while cellular-connected, as opposed to automatically starting the task when WiFi-connected.

Conventionally, the UE 140 can select between these different modes of operation based on its connection 130. However, as has been described in the tethering example of FIG. 1, the network connection 110 of the router device 120 may be the more important factor in determining the mode of operation of UE 140. Router 120 can be configured to transmit a message including an indication of its northbound network access technology to UE 140. UE 140 can be configured to receive such a communication and to modify its behavior in accordance with the network access technology used by its access point 120 (e.g. as opposed to, or in combination with, using the access technology type of its local connection 130).

Those skilled in the art will appreciate that multiple message types and formats can be used to communicate this information between routers and their connected devices. Protocols such as Dynamic Host Configuration Protocol version 6 (DHCPv6) can similarly be used to convey this information. The embodiments described herein are provided as non-limiting, illustrative examples.

Those skilled in the art will appreciate that in common networking scenarios, such as wireless local area network (WLAN) described in Institute of Electrical and Electronics Engineers (IEEE) 802.11, a device must be in an authenticated and associated state before sending traffic through an access point. The device can send probe messages to discover networks in its proximity and/or the access point can send network advertisement messages (e.g. such as periodically sending a service set identifier (SSID) beacon). A series of configuration or management messages can be exchanged to establish Layer 2 connectivity between the access point and the device. In some embodiments, one or more of these connection establishment messages can be used by an access point to advertise its uplink/northbound network access technology(ies) to a device.

In some embodiments, an IPv6 Neighbor Discovery option (such as described in Internet Engineering Task Force (IETF) Request for Comments (RFC) 4861) can be used by an access point to advertise its uplink/northbound network access technology(ies) in a router advertisement message, following the establishment of connectivity between the access point and a device.

IPv6 nodes (hosts and routers) on the same link use the Neighbor Discovery Protocol to discover each other's presence, to determine each other's link-layer addresses, to find routers, and to maintain reachability information about the paths to active neighbors. Hosts also use Neighbor Discovery to find neighboring routers that are willing to forward packets on their behalf. The Neighbor Discovery Protocol defines packet types for the purpose of router solicitation, router advertisement, neighbor solicitation, neighbor advertisement, and network redirects. Routers can advertise their presence together with various link and Internet parameters either periodically, or in response to a Router Solicitation message, by a Router Advertisement message. Hosts can thus discover/locate routers residing on attached links.

A router periodically broadcasts a Router Advertisement packet announcing its availability. A host receives Router Advertisements from all routers, building a list of default routers. Routers can generate Router Advertisements frequently enough that hosts will learn of their presence quickly, but not frequently enough to rely on an absence of advertisements to detect a router failure. Router Advertisements contain a number of parameters that are used by the host(s) to establish a connection (e.g. to be able to send packets) to the router. Router Advertisements carry link-layer addresses, such that no additional packet exchange is needed to resolve the router's link-layer address.

The Router Advertisement message format includes a number of defined fields as specified in RFC 4861 (e.g. IP source address, IP destination address, router lifetime, reachable time, retransmission time) as well as optional fields.

Figure 2:
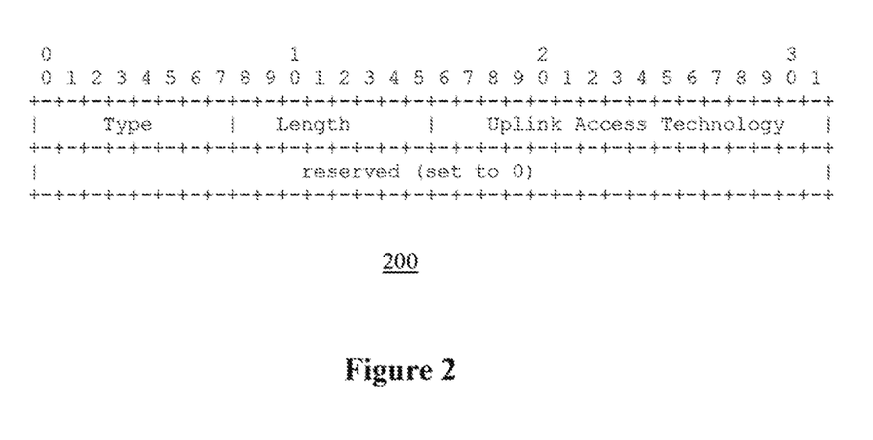
FIG. 2 illustrates an Uplink Access Technology (UAT) Option Layout.

FIG. 2 illustrates one example of an Uplink Access Technology (UAT) option field layout 200 which can be carried in Router Advertisement messages broadcast by a router on a given link. It can be used to specify the uplink network type(s) that the router uses. This example Uplink Access Technology option 200 can include Type, Length, and Uplink Access Technology fields.

Type is an 8-bit identifier of the type of option. The option identifier for the UAT option can be allocated by the Internet Assigned Numbers Authority (IANA).

Length is an 8-bit unsigned integer. The length of the option (including the type and length fields) in units of 8 octets. It can be set to 1.

Uplink Access Technology is a 16-bit field that specifies the uplink/northbound access technology used by the router sending the Router Advertisement carrying this option.

Multiple UAT options can be added to a single Router Advertisement message to allow for routers that use multiple uplink network connections, using different access technologies.

Figure 3:
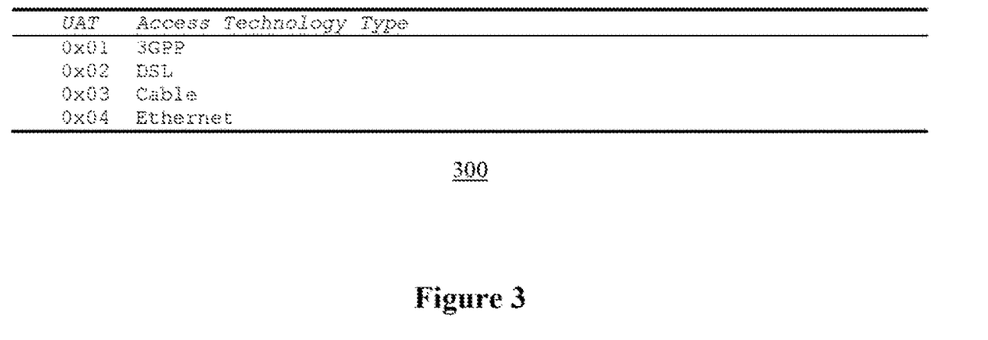
FIG. 3 illustrates an example set of values for the UAT field.

FIG. 3 illustrates an example set of initial values 300 for the UAT field that can be extended by adding new values to the IANA registry. For example, 0x01 can be the value used in the UAT field to indicate a 3GPP type of uplink access technology connection, 0x02 for Digital Subscriber Line (DSL), 0x03 for Cable, 0x04 for Ethernet, etc. Those skilled in the art will appreciate that these values are provided as a non-limiting example only, and can be set accordingly to identify and differentiate between different access technologies as required.

The value of the UAT(s) provided in this option can either be administratively configured or implicitly derived from the access technology type on the uplink interfaces. The router will set the value of the UAT field in accordance with its uplink network connectivity.

The value of the UAT(s) provided in this option is informational for the host(s). It can help the hosts gleam additional information about the router's network connection and perform different actions accordingly. Legacy hosts that do not recognize this option field can simply ignore it.

Those skilled in the art will appreciate that FIGS. 2 and 3 illustrate a non-limiting example embodiment. The described Uplink Access Technology information can be provided by an access point to a host device in a variety of different messages and/or formats.

Figure 4A:
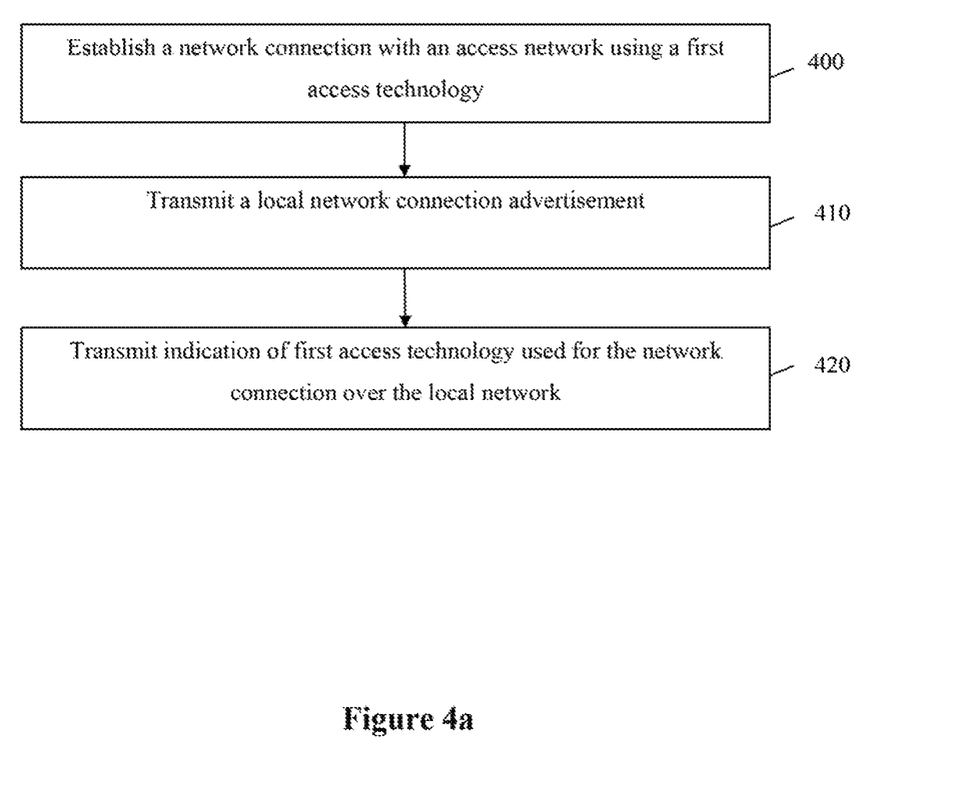
FIG. 4a is a flow chart illustrating a method for communicating access technology information.

FIG. 4a is a flow chart illustrating a method for communicating network access technology information. The method can be performed by a network device as described herein that is operative to provide a network connection to other devices and thus, act as a router or an access point for the other devices. The access point device establishes a network connection with an access network using a first access technology (block 400). The first access technology defines the type of connection (i.e. cellular, Ethernet, etc.) by which the access point connects to the access network.

The access point device then transmits a local network connection advertisement (block 410). In some embodiments, the advertisement can be transmitted using a second access technology. The advertisement can be transmitted to a particular device or alternatively, the advertisement can be broadcasted as a device-nonspecific message. For example, the advertisement can be multicast to zero or more devices. In some embodiments, the first and second access technologies can be different types of access technologies.

The access point device transmits an indication of the first access technology used for the network connection (block 420). The indication can be broadcast over the local network. The indication can be transmitted to at least one device connected to the local network. In some embodiments, the indication of the network connection access technology can be included in the local connection advertisement message. In other embodiments, it can be included in a separate, subsequent message.

In some embodiments, the transmitted local network connection advertisement (block 410) can be a network information control message. A network information control message can be a configuration or a management message associated with the local network, such as a WiFi beacon. Optionally, the indication of the first access technology can be included in such a network information control message. In other embodiments, the indication of the first access technology can be sent in a subsequent message.

In some embodiments, the transmitted local connection advertisement (block 410) can be a Router Advertisement message. Optionally, the indication of the first access technology can be included in such a Router Advertisement message. In some embodiments, an option field can be added to the Router Advertisement message, the option field identifying the type of access technology used by the access point to connect to the access network.

In some optional embodiments, the indication of the first access technology can be transmitted in response to determining that the first access technology (e.g. used for the uplink/northbound connection to the access network) and the second access technology (e.g. used for the downlink/southbound connection to the local network) are different types of access technologies. In some embodiments, the indication of the first access technology can be transmitted in response to determining that the access point is offering a tethered (wired or wireless) local network connection.

In some embodiments, the local connection advertisement and/or the indication of the first access technology can be transmitted by the access point device periodically.

In some embodiments, a plurality of network access technologies used by the access point can be indicated.

In some embodiments, a connection between the access point and a device can be established following the transmission of the connection advertisement message (block 410). The access point can receive packets from the device.

In some embodiments, the indication of the first access technology can be transmitted to cause the at least one device to select a mode of operation. The mode of operation of the device can be configured, modified, selected, etc. at least partially in accordance with the first access technology used by the access point.

Figure 4B:
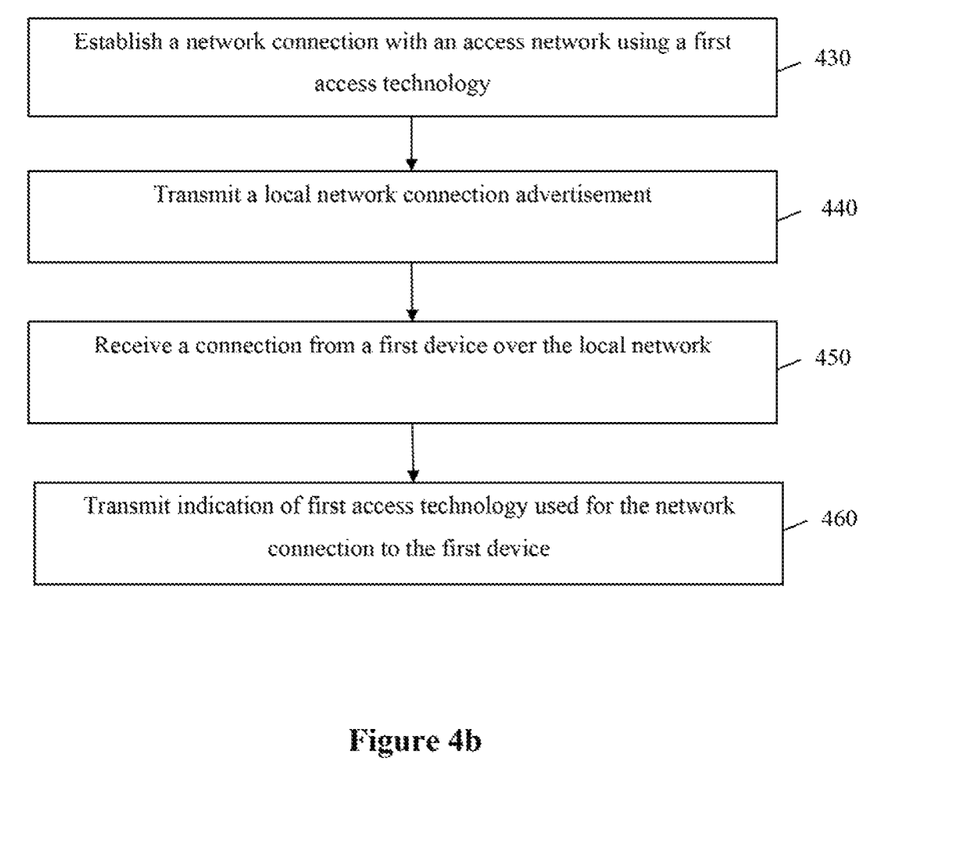
FIG. 4b is a flow chart illustrating a method for communicating access technology information.

FIG. 4b is a flow chart illustrating an alternative method for communicating network access technology information. The method can be performed by an access point device as described herein. The access point device establishes a network connection with an access network using a first access technology (block 430). In an exemplary embodiment, the access point can connect to the access network via a cellular (e.g. LTE) connection.

The access point device transmits a local network connection advertisement (block 440). In some embodiments, the advertisement can be transmitted using a second access technology, such as WiFi for example. In some embodiments, the access point can advertise a tethered or mobile hotspot network. In some embodiments, the local network advertisement can be broadcast towards one or more devices.

The access point receives a connection, or connection request, from a first device (block 450). The connection can be received over the local network requesting access for the first device to the local network.

The access point transmits, to the first device, an indication of the first access technology used for its network connection with the access network (block 460). In some embodiments, the indication of the first access technology can be included in the local network connection advertisement broadcast by the access point. In other embodiments, the indication of the first access technology can be included in at least one other message.

Figure 5:
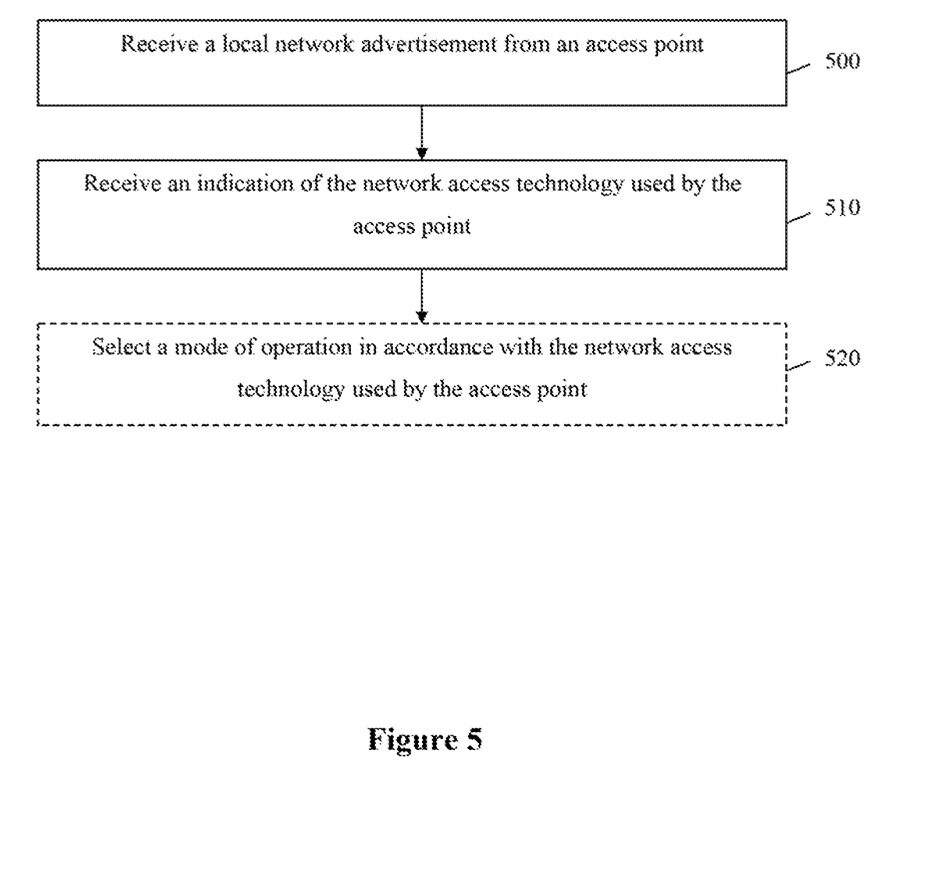
FIG. 5 is a flow chart illustrating a method for receiving access technology information.

FIG. 5 is a flow chart illustrating a method for receiving network access technology information. The method can be performed by a network device or UE. The method begins by the device receiving a local network advertisement from an access point (block 500). The local network advertisement can be a connection advertisement message. The connection advertisement message can indicate the availability of a local network. In some embodiments, the local network advertisement can be a network information control message, such as a WiFi beacon, sent by the access point. In some embodiments, the local network advertisement can be a Router Advertisement message sent by the access point. In some embodiments, the local network advertisement can be broadcast using a first access technology type (e.g. WiFi).

The device receives an indication of the network access technology used by the access point (block 510). This indication can be received in the connection advertisement or in another subsequent message. The device can determine the network access technology used by the access point in accordance with the indicator. In some embodiments, the access technology used by the access point can be a second access technology type (e.g. cellular).

In some embodiments, when multiple routers/access points are present, the information advertised collectively by all routers may be a superset of the information contained in a single connection advertisement. Additional information may be obtained by the device through other dynamic means such as Dynamic Host Configuration Protocol (DHCP).

In some embodiments, the device can store received connection advertisement information in a router list. On receipt of a valid connection advertisement, the device can extract the source address of the packet and process it as required. If the address is not already present in the device's router list, it can create a new entry in the list, and initialize any required values as indicated. If the address is already present in the device's router list (e.g. as a result of a previously received advertisement), the device can reset values such as its invalidation timer to the Router Lifetime value in the newly received advertisement. If the address is already present in the device's router list and the received Router Lifetime value is zero, the device can immediately time-out the entry.

In some embodiments, after extracting information from the fixed part of the connection advertisement message, the advertisement can be scanned for valid option fields. If the advertisement contains an option field indicating an access technology or access technology type used by the access point device, the indicated network access technology can be stored accordingly in the device's router list. In some embodiments, the access technology information can be included in an Uplink Access Technology (UAT) option field.

In some embodiments, the device can select a mode of operation in accordance with the network access technology used by the access point (block 520). This can include setting, configuring and/or modifying device behaviors or actions based on the access point's network connection type. In some embodiments, this can include modifying any policies referring to the device's network access technology to instead use the access point's network access technology. In some embodiments this can include restricting or suspending data upload and/or download functionality. This can include limiting the size and/or duration of any data communication activity of the device while the access point uses the network access technology indicated.

In some embodiments, a mode of operation can be selected (block 520) based at least partially on a network access technology used by the access point, a local network access technology used by the device, and/or any combination thereof.

In some embodiments, the device can be configured to alert and/or prompt the user upon determining that the access technology of the device and the network access technology of the access point are different. The user can be prompted to select a course of action (e.g. select an operating mode) for the device.

In some embodiments, a connection between the access point and the device can be established following the receipt of the connection advertisement message (in block 500).

Once a connection is established, the device can exchange packet traffic with the access point.

Figure 6:
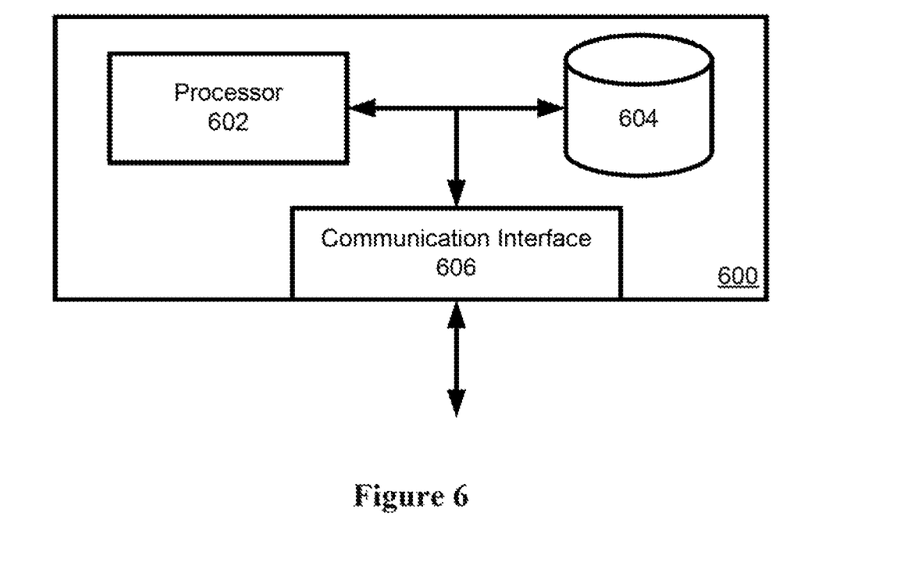
FIG. 6 is a block diagram of a network device.

FIG. 6 is a block diagram illustrating an example network device 600 according to embodiments of the present invention. Network device 600 can be any of the router, host, access point, mobile device, or UE nodes as have been described herein. The network device 600 includes circuitry including a processor 602, a memory or instruction repository 604 and a communication interface 606. The communication interface 606 can include at least one input port and at least one output port. When operative as a router/access point, the communication interface 606 can include an access network communication interface and a local network communication interface. The memory 604 contains instructions executable by the processor 602 whereby the network device 600 is operable to perform the various embodiments as described herein. In some embodiments, the network device 600 can included virtualized components hosted by the underlying physical hardware. Network device 600 can be configured to implement any of the methods and procedures illustrated in FIGS. 4a, 4b and 5.

When operative as an access point, device 600 is configured to establish a network connection with an access network using a first access technology. Device 600 then transmits a local network advertisement and transmits an indication of the first access technology used for the network connection to the access network.

When operative as a mobile device, device 600 is configured to receive a local network advertisement from an access point. Device 600 also receives an indication of a first access technology used by the access point to connect to an access network. In some embodiments, device 600 is further configured to select a mode of operation in accordance with the indicated first access technology used by the access point.

Figure 7:
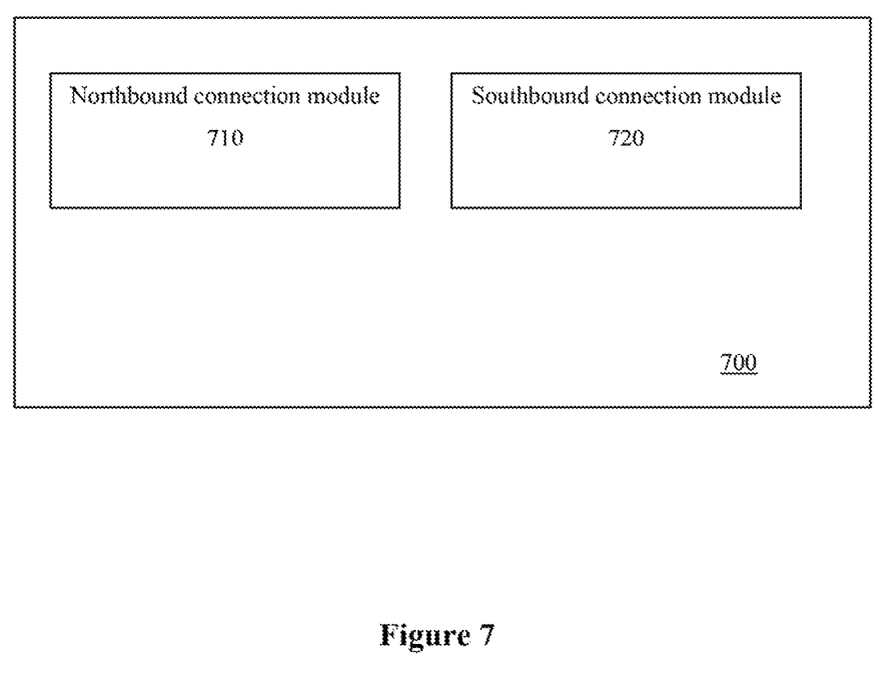
FIG. 7 is a block diagram of an access point device.

FIG. 7 is a block diagram of an example access point device 700 according to embodiments of the present invention. The access point device can be a user equipment capable of sharing its network connection with one or more other devices. The access point device can include a northbound connection module 710 and a southbound connection module 720. The northbound connection module 710 can be configured to establish an uplink/northbound network connection using a first access technology. The southbound connection module 720 can be configured to transmit a downlink/southbound connection advertisement to at least one other device using a second access technology. The southbound connection module 710 can be further configured to transmit an indication, to the at least one other device, that the northbound network connection module 710 uses the first access technology to connect to the access network.

Figure 8:
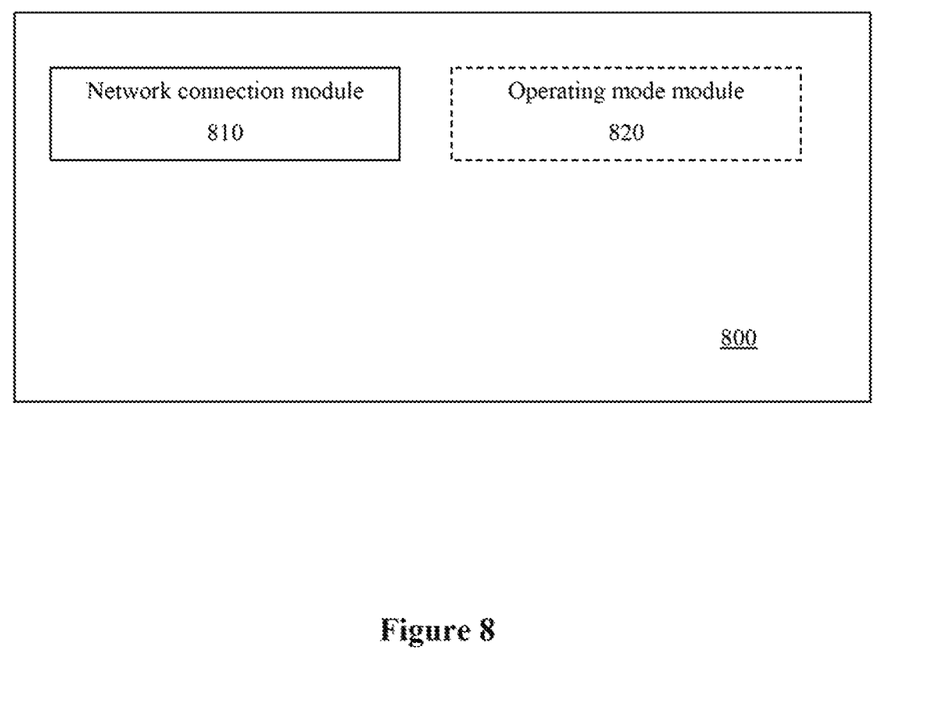
FIG. 8 is a block diagram of a user equipment.

FIG. 8 is a block diagram of an example user equipment 800 according to embodiments of the present invention. In some embodiments, the user equipment 800 can be tethered to an access point device. The user equipment 800 can include a network connection module 810 and operating mode module 820. The network connection module 810 can be configured to receive a connection advertisement from an access point. The network connection module 810 can be further configured to receive an indication of the uplink/northbound access technology that is used by the access point. The operating mode module 820 can be configured to determine a mode of operation for the user equipment in accordance with the access technology used by the access point. In some embodiments, the connection advertisement can be received over a first type of access technology (e.g.

WiFi) and the uplink/northbound access technology used by the access point can be a second type of access technology (e.g. cellular). In some embodiments, the operating mode module 820 can be configured to select between a plurality of operating modes, each corresponding to a different access technology type, in accordance with the indicated uplink/northbound access technology used by the access point.

Embodiments of the present invention may be represented as a software product stored in a machine-readable medium (also referred to as a computer-readable medium, a processor-readable medium, or a computer usable medium having a computer readable program code embodied therein). The non-transitory machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method performed by a network device, the method comprising:
   receiving, from an access point, a local network advertisement message indicating an availability of a local area network offered by the access point;
   receiving, from the access point, an indication of a first access technology used by the access point to connect to an access network;
   establishing a connection with the access network via the local area network using a second access technology; and
   selecting a mode of operation of the network device in accordance with the first access technology used by the access point to connect to the access network, selecting the mode of operation including restricting data communication activity between the network device and the access point.

2. The method of claim 1, wherein the indication of the first access technology used by the access point is included in the received local network advertisement message.

3. The method of claim 1, wherein the local network advertisement message is a network information control message transmitted by the access point.

4. The method of claim 1, wherein the local network advertisement message is a router advertisement message transmitted by the access point.

5. The method of claim 4, wherein the indication of a first access technology used by the access point is included in an option field in the router advertisement message.

6. The method of claim 1, wherein the local network advertisement message is received via the second access technology.

7. The method of claim 6, further comprising determining that the first access technology and the second access technology are different types of access technologies.

8. The method of claim 1, wherein selecting the mode of operation of the network device is further based at least in part on a second network access technology associated with the local network advertisement message.

9. The method of claim 1, wherein a first mode of operation configures the network device to perform automatic upload/download functions, and a second mode of operation configures the network device to suspend automatic upload/download functions.

10. The method of claim 1, wherein restricting data communication activity includes restricting at least one of uploading and downloading data.

11. A network device comprising: circuitry including a processor and a memory, the memory containing instructions executable by the processor whereby the network device is operative to:
    receive, from an access point, a local network advertisement message indicating an availability of a local area network offered by the access point;
    receive, from the access point, an indication of a first access technology used by the access point to connect to an access network;
    establish a connection with the access network via the local area network using a second access technology; and
    select a mode of operation of the network device in accordance with the first access technology used by the access point to connect to the access network, selecting the mode of operation including restricting data communication activity between the network device and the access point.

12. The network device of claim 11, wherein the indication of the first access technology used by the access point is included in the received local network advertisement message.

13. The network device of claim 11, wherein the local network advertisement message is a network information control message transmitted by the access point.

14. The network device of claim 11, wherein the local network advertisement message is a router advertisement message transmitted by the access point.

15. The network device of claim 14, wherein the indication of a first access technology used by the access point is included in an option field in the router advertisement message.

16. The network device of claim 11, wherein the local network advertisement message is received via the second access technology.

17. The network device of claim 16, further operative to determine that the first access technology and the second access technology are different types of access technologies.

18. The network device of claim 11, wherein selecting the mode of operation of the network device is further based at least in part on a second network access technology associated with the local network advertisement message.

19. The network device of claim 11, wherein a first mode of operation configures the network device to perform automatic upload/download functions, and a second mode of operation configures the network device to suspend automatic upload/download functions.

20. The method of claim 11, wherein restricting data communication activity includes restricting at least one of uploading and downloading data.

* * * * *

UNITED STATES PATENT AND TRADEMARK OFFICE
CERTIFICATE OF CORRECTION

PATENT NO. : 10,952,129 B2
APPLICATION NO. : 15/742141
DATED : March 16, 2021
INVENTOR(S) : Suresh Krishnan It is certified that error appears in the above-identified patent and that said Letters Patent is hereby corrected as shown below:

On the Title Page

In Item (57), under "ABSTRACT", in Column 2, Line 8, delete "nut" and insert -- but --, therefor.

In the Specification

In Column 4, Line 42, delete "intended specify" and insert -- intended to specify --, therefor.

In Column 5, Line 38, delete "confirmation of a performing a downloading" and insert -- confirmation of performing a downloading --, therefor.

In Column 10, Line 48, delete "southbound connection module 710" and insert -- southbound connection module 720 --, therefor.

Signed and Sealed this
Seventeenth Day of May, 2022

Katherine Kelly Vidal
*Director of the United States Patent and Trademark Office*